United States Patent
Schuh

(10) Patent No.: US 7,406,996 B2
(45) Date of Patent: Aug. 5, 2008

(54) TARPAULIN MOUNTING FRAME

(76) Inventor: Rainer Karl Schuh, Willendorfer Gasse 32, Wiener Neustadt (AT) A-2700

( * ) Notice: Subject to any disclaimer, the term of this patent is extended or adjusted under 35 U.S.C. 154(b) by 171 days.

(21) Appl. No.: 10/547,458

(22) PCT Filed: Mar. 5, 2004

(86) PCT No.: PCT/AT2004/000072

§ 371 (c)(1),
(2), (4) Date: Aug. 30, 2005

(87) PCT Pub. No.: WO2004/081908

PCT Pub. Date: Sep. 23, 2004

(65) Prior Publication Data

US 2006/0260211 A1   Nov. 23, 2006

(30) Foreign Application Priority Data

Mar. 10, 2003   (AT) ............................... A 367/2003
Nov. 6, 2003    (AT) ............................... A 1775/2003

(51) Int. Cl.
*E06B 3/80* (2006.01)

(52) U.S. Cl. ............................... 160/328; 160/395

(58) Field of Classification Search ............... 160/327, 160/328, 368.1, 392, 395, 378; 40/590, 591, 40/603, 604; 52/4
See application file for complete search history.

(56) References Cited

U.S. PATENT DOCUMENTS

| 4,279,064 A * | 7/1981  | Simme ........................ 24/496 |
| 4,403,642 A * | 9/1983  | Morris ....................... 160/380 |
| 4,549,334 A * | 10/1985 | Miller ......................... 29/278 |
| 4,769,877 A * | 9/1988  | Conley ........................ 24/462 |
| 6,250,002 B1  | 6/2001  | Wittenberg |
| 6,564,488 B2 *| 5/2003  | Wittenberg .................. 40/603 |
| 6,689,123 B2 *| 2/2004  | Pinchasik ..................... 606/1 |
| 7,159,349 B2 *| 1/2007  | Uccello et al. ................ 40/603 |
| 2002/0104245 A1 | 8/2002 | Nestor et al. |

FOREIGN PATENT DOCUMENTS

| EP | 1271456 A    | 1/2003 |
| WO | WO-0135382 A | 5/2001 |

* cited by examiner

Primary Examiner—David Purol
(74) Attorney, Agent, or Firm—Friedrich Kueffner

(57) ABSTRACT

The invention relates to a tarpaulin mounting frame, in particular for a truck or a truck trailer comprising a chassis profile (4) and an anchor profile (5) which is provided with a round foot (17, 17') on the longitudinal edge thereof oriented towards the tarpaulin (19). Said foot is insertable or introducible in one or several round slots (16, 16') of the chassis profile (4) or an intermediate profile (35) connected thereto. The anchor profile (5) is arranged in a parallel direction with respect to the tensed tarpaulin by rotating around the foot thereof (17, 17'). The anchor profile (5) or weatherstrip profile (26), which is connected in such a way that it is displaceable, is provided with at least one weather-strip reception device (22). Said invention is characterized in that the anchor profile (5) contacts the chassis profile (4) or the intermediate profile (35) connected thereto between the foot (17, 17') of the anchor profile (5) and the weather-strip reception device (22).

7 Claims, 6 Drawing Sheets

TARPAULIN MOUNTING FRAME

CROSS-REFERENCE TO RELATED APPLICATIONS

This application is an U.S. national phase application under 35 U.S.C. §371 based upon co-pending International Application No. PCT/AT2004/000072 filed on Mar. 5, 2004. Additionally, this U.S. national phase application claims the benefit of priority of co-pending International Application No. PCT/AT2004/000072 filed on Mar. 5, 2004, Austrian Application No. 367/2003 filed on Mar. 10, 2003 and Austrian Application No. 1775/2003 filed on Nov. 6, 2003. The entire disclosures of the prior applications are incorporated herein by reference. The international application was published on Sep. 23, 2004 under Publication No. WO 2004/081908 A1.

BACKGROUND OF THE INVENTION

1. Field of the Invention

The invention concerns a tightening frame for a tarpaulin, especially for mounting on a truck or truck trailer with a frame profile and an anchor profile that has, on its long edge facing the tarpaulin, a rounded-off foot, which can be inserted into one of optionally several rounded-off grooves of the frame profile or an intermediate profile connected to it and pivoted in it, in which case the anchor profile, by pivoting around its foot, enters the tightened state of the tarpaulin and a position parallel to the plane of the tarpaulin, and in which either the anchor profile or a weather-stripping profile connected to pivot with it has at least one receptacle for a weather strip, corresponding to the introductory part of claim 1.

2. Description of the Prior Art

This type of tightening frame is disclosed in WO 01/35382 A. FIGS. 15 to 30, in particular, of this document show a variant in which the tightening conditions for the tarpaulin can be easily varied by a number of parallel ledges, in which the frame is intrinsically secured in the rest state by the geometric dimensions, i.e., without additional fastenings, against undesired opening. However, the following must be said concerning this:

The upper weatherstrip profile is exposed by the tension of the tarpaulin to a counterclockwise torque, in FIG. 30, around the suspension point on the frame profile. This would lead to a reduction in tension of the tarpaulin, but the weatherstrip profile, due to its edge extending upward and toward the plane of the frame (not shown), cannot be rotated so that selected ledges remain fixed on the notch of the frame profile.

The situation is similar on the lower edge of the tarpaulin: tension of the tarpaulin exposes the weatherstrip profile to a clockwise torque around its pseudojoint (roughly in the center of the profile, formed by the end of the protruding part of the frame profile). Movement in the clockwise direction around this point, however, is hampered by the tarpaulin profile, on which the end of the weatherstrip profile away from the tarpaulin is suspended. This tightening profile is also exposed to a clockwise torque and, on the other hand, is supported on the frame (not shown) with its widely protruding end. However elegant this solution appears to be at first glance, it is problematic in practice: Because of the far protruding arm of the frame profile on whose ends the pivot axes of the weatherstrip profile are formed as pseudoaxes, large bending moments and bending stresses occur that must be tolerated over the entire service life of the profile even during rough operation without permanent deformation. To this, it must be added that the entire tensile force of the tarpaulin acts on the outermost ends of these arms, which makes an overload very easily possible during application of the tarpaulin by the tightening profile.

Finally, the intrinsic security of the tightening frame depends exclusively on contact of the outermost edges of the weatherstrip profile or tightening profile on the components that are not part of the frame, which, on the one hand, leads to high bending stresses and the tendency toward plastic deformations or rupture because of the absence of any other support of this profile and, on the other hand, requires corresponding design of the components to carry the frame.

The design of the profile is not appropriate for reliably maintaining intrinsic security in the case of vibrations, or in the case of penetration and freezing of water in the gaps between the frame or the frame's surroundings and the weatherstrip profile or tightening profile, inevitably causing opening of the tightening frame.

Another drawback is that discrete snap-in possibilities into the profile acting on the tarpaulin are only provided on the tightening side opposite the tightener or tightening device. Moreover, the profile separates where no tightening is present, so that handling of the tarpaulin or profile by a single person is almost impossible.

Another type of frame is disclosed in EP 0 495 688 A1 and in a variant that comes closest to the invention, according to FIGS. 4a and 4b of this document. However, these figures show a tightening device for a tarpaulin in which, even in the end position, a torque always remains in the opening direction of the tightening device because of tension in the tightened tarpaulin; it is therefore not intrinsically secure. Even during the use of fixed poster walls or the like, this tightening device must always be additionally secured, which occurs in the depicted case by an elastic snap connection. This tendency for opening of the tightening device also exists when the two tightening frames are not arranged, as disclosed, normal to the actual tarpaulin surface, but run in the plane of the tarpaulin, since even then the connection or deflection edges that are necessarily provided cause torque in the opening direction. In addition, the device known from EP 0 495 688 A1 offers no possibility for easy and simple adaptation of tightening or adjustments to different tarpaulin sizes, as can be the case, for example, during expansion of the fabric exposed to tension for a longer time. For example, during adjustment of tarpaulin tightening on the frame, the tightening profile must be threaded around a different weatherstrip groove.

In comparison with this, the invention seeks to devise a so-called intrinsically secure tightening device, which is understood to mean a device that is held in the closed position by the tension in the tarpaulin. The fact that in different applications, such as in the tarpaulins of trucks or the like, additional fastening can be provided as an additional means of security, changes nothing in the objective of this intrinsic security.

U.S. Pat. No. 5,893,227 A discloses a tightening frame similar to the one in the aforementioned documents, but in which the possibility of simple and rapid adaptation to alter tightening conditions can be achieved due to the presence of several groove-like recesses (these can also be called hook-like protrusions). The problem of intrinsic security, however, also fully exists here and is solved by an outer profile that is snapped over the entire frame so that tilting away of the actual tarpaulin holder in the opening direction is prevented. The tightening devices in this tightening frame also lie in a plane that runs normal to the plane of the tarpaulin and, unlike EP 0 495 688 A1, an arrangement within or parallel to the plane of the tarpaulin is not possible here, since securing with the outer profile no longer functions and the tightening frame can no longer be used.

In comparison with this prior art, the task of the invention is to devise a tightening frame that does not have these drawbacks.

A tightening frame in which the individual frame components are much more favorably loaded than in the aforementioned document, but which, as follows especially from FIGS. 9 and 10, is not intrinsically secure but requires additional fastening, is known from EP 1 271 456 A. In addition, this tightening frame, interestingly, is only adjustable so that the weatherstrips of the tarpaulin are threaded out over the entire length of the tightening frame and threaded back into another of the numerous weatherstrip receptacles of the frame. This need for the threading in and threading out of the weatherstrip is extremely time-consuming and irksome, also requiring considerable room because of the length of the frame and the rigidity of the weatherstrip, and cannot be performed everywhere without problems.

This was obviously also recognized by the inventor of the device according to the aforementioned document, which led to U.S. Pat. No. 6,209,245 B, in which the adjustability of tightening is guaranteed by a sawtooth profile and a counterprofile, but in which any type of tightening frame that can be mounted by folding or pivoting is dispensed with and in which intrinsic security also plays no role, since the tightening frame is fastened by screws, which is to be avoided, in principle, by the invention and would be permitted only as an additional expedient, if at all (prevention of theft, etc.).

WO 03/030133 A discloses a tightening frame that is intrinsically secure, but uses a winding bar instead of a weatherstrip to hold the tarpaulin edge, which is rejected by users in practice. The reason for this rejection is not only the irksome winding of the winding rod with the tarpaulin edge because it must be precise and in which the edge can be several meters long, but also the fact that creeping of the tarpaulin along the winding rod cannot be ruled out over longer periods due to tightening of the tarpaulin, especially during vibrations. Also, dimensional changes caused by heat make it so that additional fastening of the tarpaulin on the winding rod is always necessary in practice, with the advantages of a winding rod relative to the weatherstrip (folding of the tarpaulin is readily possible, and the edge of the tarpaulin requires no special handling) being lost because of this.

Since the intrinsic security of the device according to WO 03/030133 A depends on the shape of the frame profile, especially in the area of its hook, as well as the intermediate profile adapted to it and the winding rod in order to achieve intrinsic security, this tightening frame could not be reconfigured for the use of a weatherstrip profile. To this we must add that because of the V-shaped design of the hook of the frame profile, strong bending movements and bending forces are exerted on the hooks, which require a corresponding massive and therefore expensive design, similar to the aforementioned WO 01/35382A.

Even if all this is considered and improved, this tightening frame still lacks easy adjustability, as is already achieved by other already known tightening frames.

Another tightening frame is known from WO 00/79507 A1. In this case the frame profile has several rows of hook-like protrusions into which a counterhook of the tarpaulin profile can be hooked. This must occur during tightening of the tarpaulin and requires a tool. Opening of the connection also requires a tool, so that replacement of the tarpaulin or its tightening, if it has expanded with time, is a demanding process.

A tarpaulin tightener that is actually a type of belt tightener is known from DE 199 15 927 A1 and is connected to the tarpaulin edge by means of a connection element. A tightener lever then works cooperatively with a tarpaulin holder that is adjustable in length and therefore determines the tightening. This device is mounted in predetermined spacings along the edge of the tarpaulin and adjusted individually, which at first glance increases the flexibility, but in actual operation only increases the adjustment work. Because of individual mounting of each tightener, the cost of installation is high and, during installation, each individual tightener must be operated separately, which is time-consuming.

Generally, as stated in WO 00/79507 A1, so-called weatherstrip profiles are commonly used for the fastening of tarpaulins to frames. These profiles are connected around the tarpaulins to the tarpaulin edge and have a bulge or thickening parallel to the tarpaulin edge that can work with a counterprofile of the frame. In ordinary, essentially rectangular tarpaulins, two adjacent sides with bulges are pushed into the counterprofile of a fixed frame; the two other sides are pushed into a counterprofile of a so-called anchor. The fixed frame profiles are mounted on a truck structure, on the house wall, or wherever the tarpaulin is to be fastened, with a counterprofile for the two anchors being fastened at a spacing that essentially corresponds to the spacing of the bulges of the tarpaulin.

These counterprofiles have grooves at relatively narrow spacings, into which a ledge of the anchor profile can be pushed. Because of the narrow spacings, it is possible to tighten the tarpaulin accordingly in order to select the best possible matching groove for introduction of the ledge of the anchor. Introduction of the ledge into the groove occurs with a tool, since substantial forces are required to keep the tarpaulin tight. In most cases the anchors are then screwed at a certain spacing, but at least in the areas of the corners by screwing with the profile having the grooves in order to prevent opening of the clamp during vibrations, shaking and, for example, during freezing of water that has penetrated into the area of the groove or ledge.

In most cases it is necessary to provide the frame profile equipped with grooves on three sides, since insufficient space is generally available for insertion of the bulge of the weatherstrip into a fixed frame profile, so that anchors are provided on three sides of the tarpaulin. The expenditure to be incurred in the course of assembly and disassembly is significant and ultimately the tight and optically attractive assembly is formed, as is essential during use of the tarpaulin as an advertising surface, but because of the precise fastening of the weatherstrip on the tarpaulin edge, corrections to the position of a weatherstrip once installed are almost ruled out. To this we must add that the ledge of the anchor on three sides of the tarpaulin must be forced into the correct groove of the frame with a tool.

Consequently, there is a demand for a fastening system for a tarpaulin that does not have the mentioned drawbacks and permits the tarpaulin to be changed quickly without problems and without tools and, at least in one embodiment, permits the disassembled tarpaulin to be folded or rolled up to the extent that the tarpaulin is acceptable per se without additional restrictions being required.

SUMMARY OF THE INVENTION

These objectives are achieved according to the invention, with the features defined in the characterizing part of claim 1, in that the anchor profile is supported between its foot and the receptacle for the weatherstrip or the weatherstrip profile on the frame profile or on the intermediate profile connected to it. Dependent claims define advantageous modifications of the invention.

Because of this support, the tightening frame in its entirety achieves a high mechanical stability and security against undesired opening.

BRIEF DESCRIPTION OF THE DRAWINGS

The invention is further explained below with reference to drawings, in which.

DESCRIPTION OF THE PREFERRED EMBODIMENT

Figure 1:
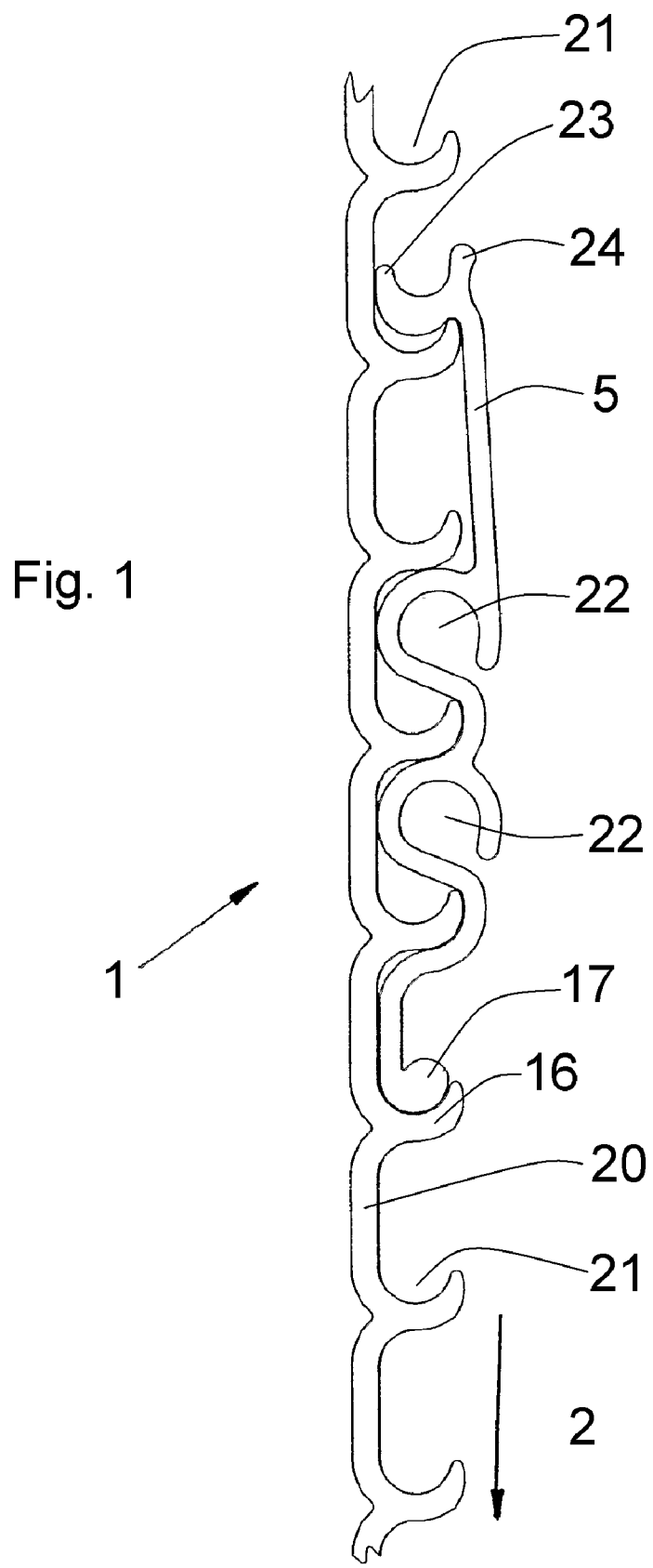
FIG. 1 shows a variant of the invention with several pivot grooves.

FIG. 1 shows a frame profile 20 with several parallel running grooves 21 in which an anchor 5 can be alternately inserted and snapped into one of several grooves 21 corresponding to the individual tarpaulin sizes. Anchor 5 works cooperatively with a weatherstrip (not shown).

The corrugated frame profile 20 is mounted and works cooperatively with an anchor 5 at a matching site on the truck, house wall, or other object to which the tarpaulin is to be fastened. Anchor 5 has a thickening or bulge 17 on its one end facing the center of the tarpaulin, which works cooperatively with one of the groove-like recesses 21 of profile 20 in the form of a joint or hinge.

However, the anchor 5 is not designed flat, but matches the corrugated shape of profile 20, then forms at least one recess, in the depicted practical example two recesses 22 lying next to each other, into which a weatherstrip can be pushed laterally.

On the end facing away from bulge 17, the anchor carries a bent arm 23 that works cooperatively with one of the recesses 21 of profile 20 in the form of a snap mechanism. An additional safety feature, for example, by screwing, can also be provided. For easier removal of the mounted anchor 5, a shorter stub 24 can be provided next to arm 23 through which the upper area of anchor 5 can be bent elastically and can therefore be more easily released from the snap connection with profile 20.

The position of holder 22 for the weatherstrip relative to snap mechanism 21-23 and rotation point 17-21 means that in the application of tension on the tarpaulin in the direction of arrow 2, the "immersion" of arm 22 into groove 21 overcomes the torque around the bulge 17 in its groove 21 and the tightening frame is made intrinsically secure.

Figure 2:
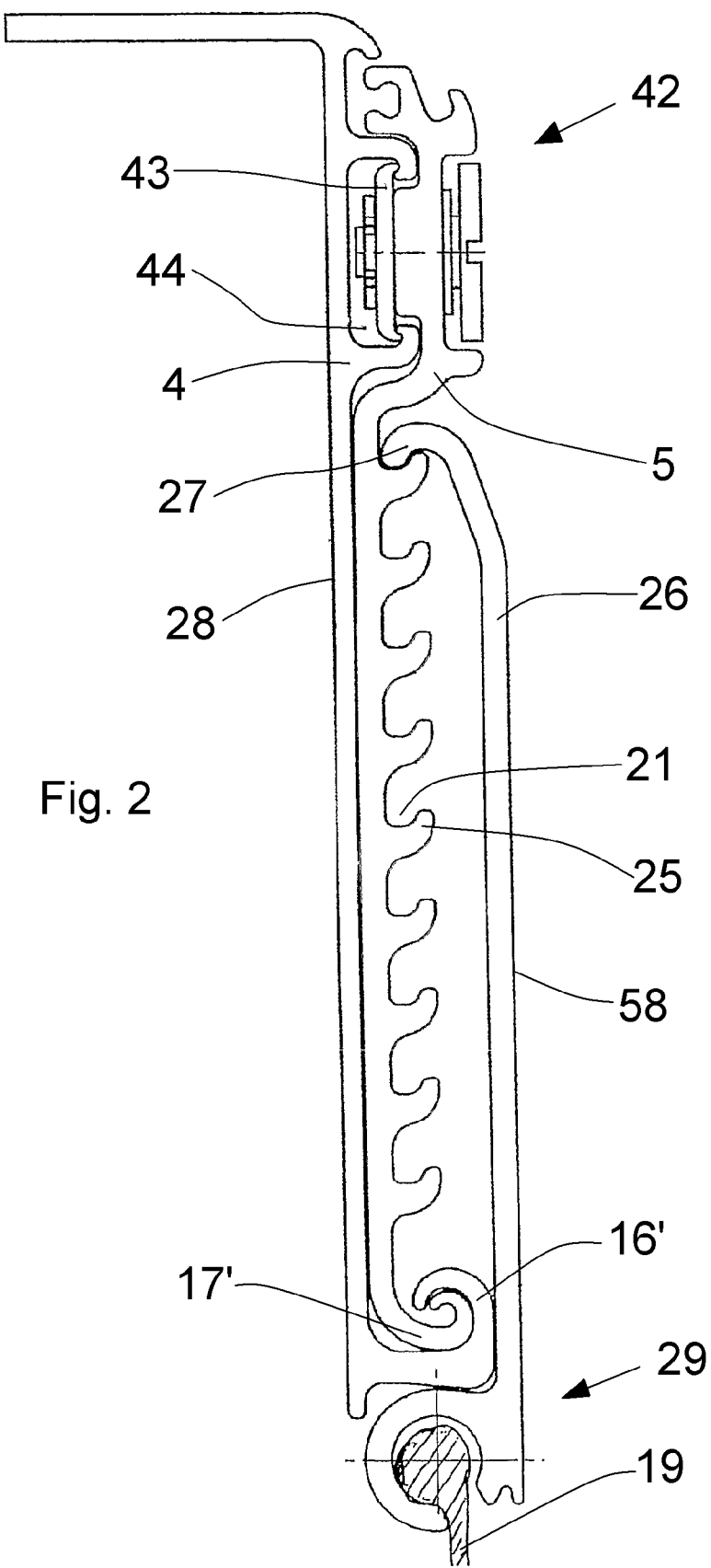
FIG. 2 shows another variant.

FIG. 2 shows a variant of the device of FIG. 1 in which tightening of the tarpaulin is also used to secure the device in the mounted position: a frame profile 4 is fastened to the object on which the tarpaulin 19 is to be tightened. An anchor profile 5 is rotatable by means of thickening 17' in a recess 16'. The shape of the two profile sections 16', 17' is spiral-like, with the two parts together forming a so-called spiral hinge. Such a hinge can be rotated within a predetermined angular range, with further rotation being prevented by shape matching. The two parts that form such a hinge can only be pushed one into the other in the axial direction (normal to the plane of the paper) and insertion one into the other as permitted by pivot part 17, 21 is ruled out. Because of this the two parts are unreleasably joined to each other as long as they are not pushed axially relative to each other (which, however, is easy to prevent by end plates), which entails major advantages in practical use.

Figure 4:
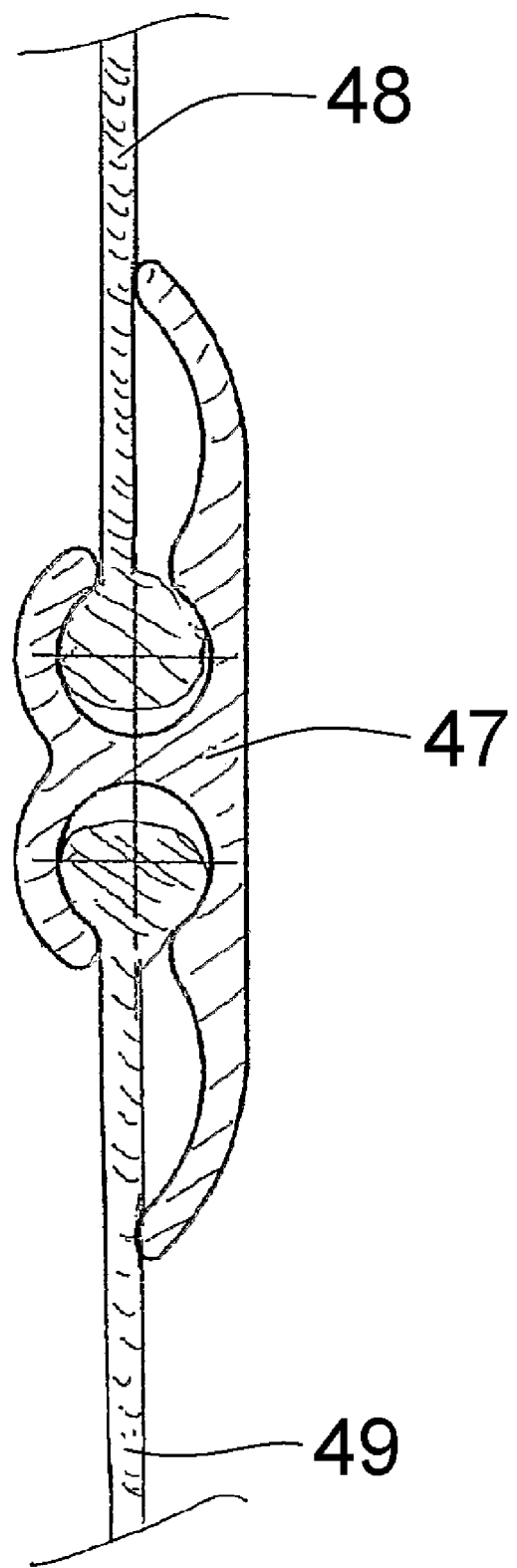
FIG. 4 shows a flying weatherstrip profile.

The anchor profile 5 has several grooves 21 and ledges 25, which permit adjustment of the weatherstrip, in a similar manner, to the groove/ledges of the frame profile according to FIG. 4. In the present example, however, the weather strip is inserted into its own weatherstrip holder 26, which is suspended with a hook 27 in the matching groove 21.

The spacings of the joints of the back plane 28 of the frame profile 4 so formed now have the following peculiarities: the profile section 29 of weatherstrip holder 26, which accommodates the weatherstrip, is designed so that the plane of the tarpaulin or tarpaulin [sic] 19 and therefore the tensile force, lies closer to this plane parallel to the back plane 28 than the rotation point of hook 27 in anchor profile 5. Because of this, a moment in the closure direction (clockwise) is exerted on the weatherstrip holder 26. The rotation point of hook 27 again lies closer to the back plane 28 than the rotation point of spiral hinge 16, 17 and anchor profile 5 relative to the (fixed) frame profile 4. Because of this, a torque is exerted by the tension in tarpaulin 19 from weatherstrip holder 26 on the anchor profile 5 in the closure direction (counterclockwise).

Since the positions of the corresponding rotational axes in the depicted "mounted state" lie just "on the other side" of a stretched position, a double dead-point mechanism is involved, in which tarpaulin tightening ensures a secure retention of the closed state. In order to allow for the effect of vibrations, freezing, and theft protection, etc., an additional safety means (screws, rivets, etc.) is also recommended in practice, but the closure is stable in a force-fit manner, which was not so easy to achieve in the prior art. In FIG. 2, a rotatable anchor mechanism 42 is shown as one such additional safety means. A holding disk 43 can enter via an angle in the undercut groove 44, and by rotation (preferably around 90.degree.) can assume the depicted position, in which its broad side lies across the groove and thus secures positioning. In both variants a high mechanical stability is achieved by contact of the individual profile parts with each other.

Figure 3:
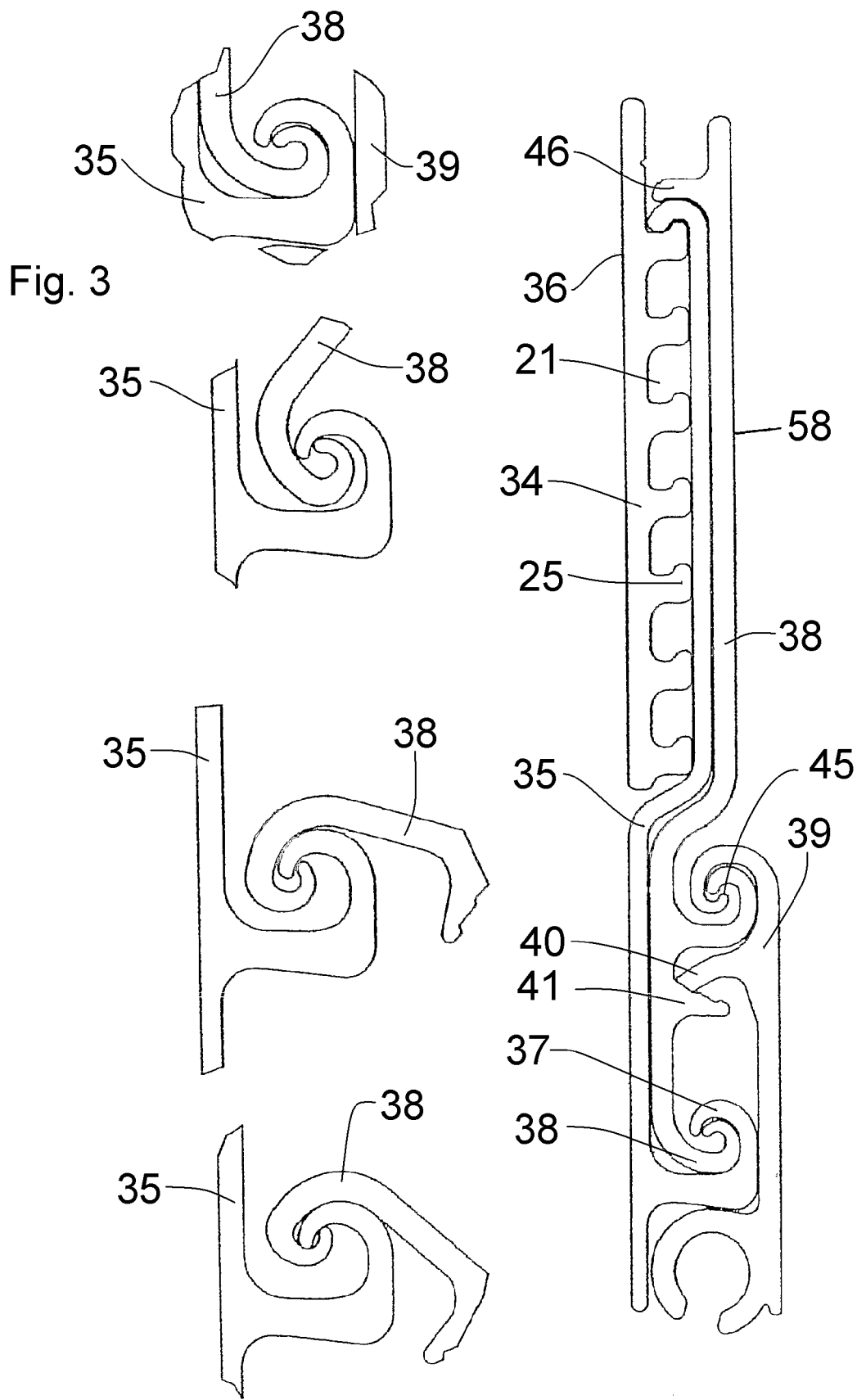
FIG. 3, with several secondary figures, shows another variant.

FIG. 3 and its secondary figures show a variant in which a particularly stable connection to the tarpaulin is created by using a weatherstrip holder 39 and a two-part anchor profile 35, 38. An intermediate holder 35 bent at right angles is suspended at a matching site on a frame profile 34 with several mounting ledges forming grooves, which has a hook 37 in a spiral shape on its side facing the tarpaulin. By bending the intermediate holder 35 at right angles, the hook lies close to the backside 36 of frame profile 34. The anchor profile 38 in hook 37, as explained above, is suspended, whereupon a weatherstrip profile 39 is inserted into a protrusion of the anchor profile 38 also designed as a spiral hinge 45. By flipping, the anchor profile up the support ledge 40 of the weather strip profile comes in contact with a support ledge 41 of anchor profile 38 and thus stabilizes the connection.

Figure 5:
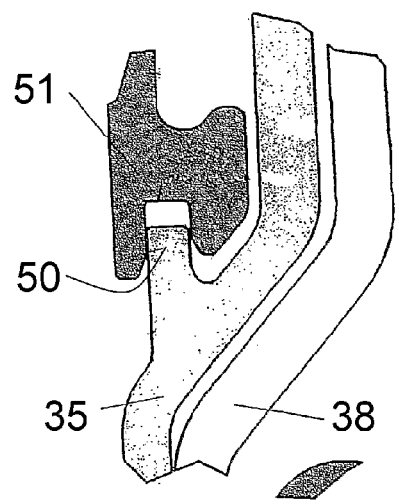
FIGS. 5 to 8 show an embodiment of the invention.
Figure 6:
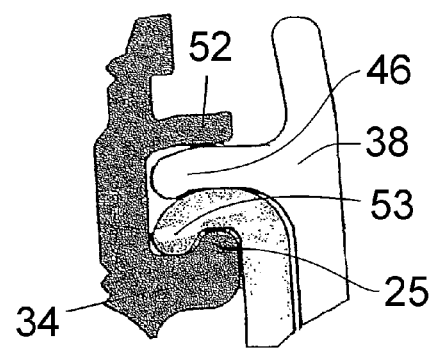
Figure 8:
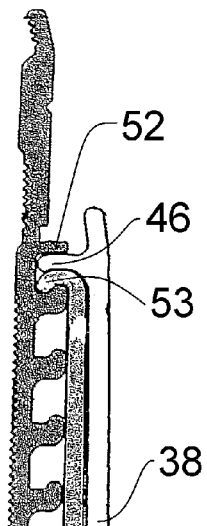
Figure 7:
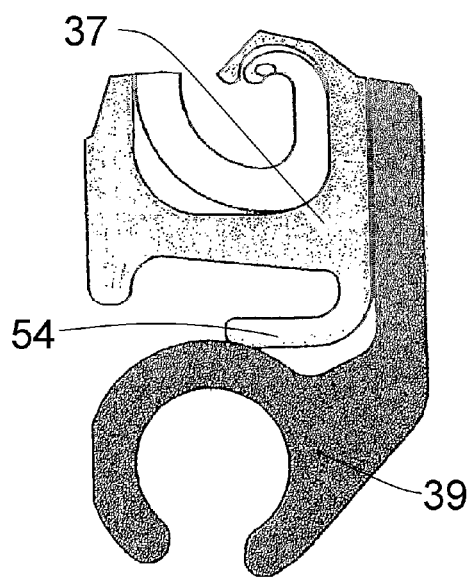

The forces and moments acting on the individual components are all oriented in the closure direction in the properly closed state, as depicted in FIG. 6, so that the closure (just as in FIG. 5) is intrinsically secure. This intrinsic security is further increased by the fact that during suspension of the intermediate profile 35 in another groove 21, as shown, during closure of the tightening frame a mounting ledge 46 of anchor 38 is forced beneath the adjacent ledge 52 of the frame profile and thus produces a force-fit fastening. In order to prevent inadvertent or abusive loosening, screws or the like can additionally be used, as mentioned above.

The secondary figures show, from the top down, the mobility of the spiral hinge between the intermediate profile 35 and the anchor 38, and show the limits of this pivotability.

FIG. 4 shows a double weatherstrip holder 47, which makes it possible to fasten finished tarpaulins of uniform size on larger surfaces. In particular, tarpaulins that carry advertising and that are produced uniformly in large number by advertising companies, and that can be changed or adapted in size by the companies that have leased advertising surfaces are involved. In order to be able to use such tarpaulins on existing larger frames, the invention proposes to join the tarpaulins 48 by using double weatherstrip holders 47 with end strips 49 of matching width, and mounting this patchwork on the frame.

The use of such double weatherstrip holders has not been possible with the tightening systems according to the prior art, since during successive tightening of the tarpaulin along its edge the weatherstrips invariably slide against each other, and an optically satisfactorily mounting required extremely high demands. Because of the invention, the tarpaulin is simultaneously tightened over the entire length of its edge, no shear forces occur, and therefore no sliding of the individual tarpaulin parts against each other in the double weatherstrip holder occurs.

FIGS. 5 to 8 show an embodiment of the invention starting from a variant similar to that depicted in FIG. 3. In this variant, it is not possible to reliably fasten the parts of the frame without a tarpaulin and to transport the individual parts of the frame without problems, especially in truck tarpaulins. In a rough operating climate and rough operating conditions in freight transport, loose individual parts of all types are strictly frowned upon and are only reluctantly accepted. To solve this problem, the following is proposed with regard to the frame according to FIGS. 5 to 8:

The intermediate profile (or intermediate holder) 35 has a stub ledge 50 directed toward the frame profile 34 in the area of its right angle bend, which extends into a groove 51 of frame profile 34. In the depicted "transport position", the groove is then deeper than the ledge is high. The frame profile in its upper area in the depiction, in which it works cooperatively with the mounting ledge 46 of anchor profile 38, has a protrusion 52 that contacts the mounting ledge 46 on its upper flank so that the mounting ledge 46 together with the upper hoop end 53 of intermediate profile 35 are axially fixed between the upper ledge 25 in which they are suspended and the protrusion 52, i.e., in the tightening direction of the tarpaulin, regardless of whether a tarpaulin is present or not [sic]. This fixation is assumed by the adjacent "upper" ledge 25 during suspension in another ledge 25.

Because of this design, the anchor profile 38 and the intermediate profile 35 are fixed together at their respective heights and secured against rotation due to the interaction between ledge 50 and groove 51. Only during the desired breakdown can the mounting ledge 46 be pulled from the intermediate space between protrusion 52 and ledge 25 (or between two adjacent ledges 25) by pulling on the anchor profile 38 on its upper end, so that it is possible to move the intermediate profile 35 (and anchor profile 38) upward (in the depiction) and bring the hoop end 53 from the hook-like area of ledge 25. The groove 51 must therefore be deeper than the ledge 50 is high so that this displacement is made possible.

The weatherstrip profile 39 in this embodiment is secured not only via the spiral hinge 45, the support ledge 40, and the enclosure of hook 37 on anchor profile 38 and on intermediate profile 35, but also by a spring ledge 54 on intermediate profile 35 that engages with the outside of the weatherstrip area, making any unintended pivoting of the weatherstrip profile 39 around spiral hinge 45 impossible. Only with corresponding force can a sufficiently large torque be exerted on the weatherstrip profile, which leads to elastic deformation of the spring ledge to a sufficient degree in order to cause pivoting. The inertial forces occurring during driving without a tarpaulin (and only this type of force occurs) are too small in magnitude to produce such a deformation.

In the depicted practical examples of FIGS. 2, 3, 8, and 9, the outer surface 58 of weatherstrip holder 26 or anchor profile 38 parallel to the plane of tarpaulin 19 is designed as a smooth surface. This permits the mounting of readily visible, preferably light-reflecting, covers, for example, the gluing on of strips of films that are prescribed by law as safety markings in traffic on outer surface 58. Naturally the outer surface 58 can also be configured as a light-reflecting surface. Strips that, as is now common, are mounted on tarpaulins, for example, by gluing or stitching, cause no problems since the strips are easily loosened by the continuous movement or vibration of the tarpaulin. Wherever no markings are made on the outer surface 58, the free space can also be used for advertising material.

Figure 9:
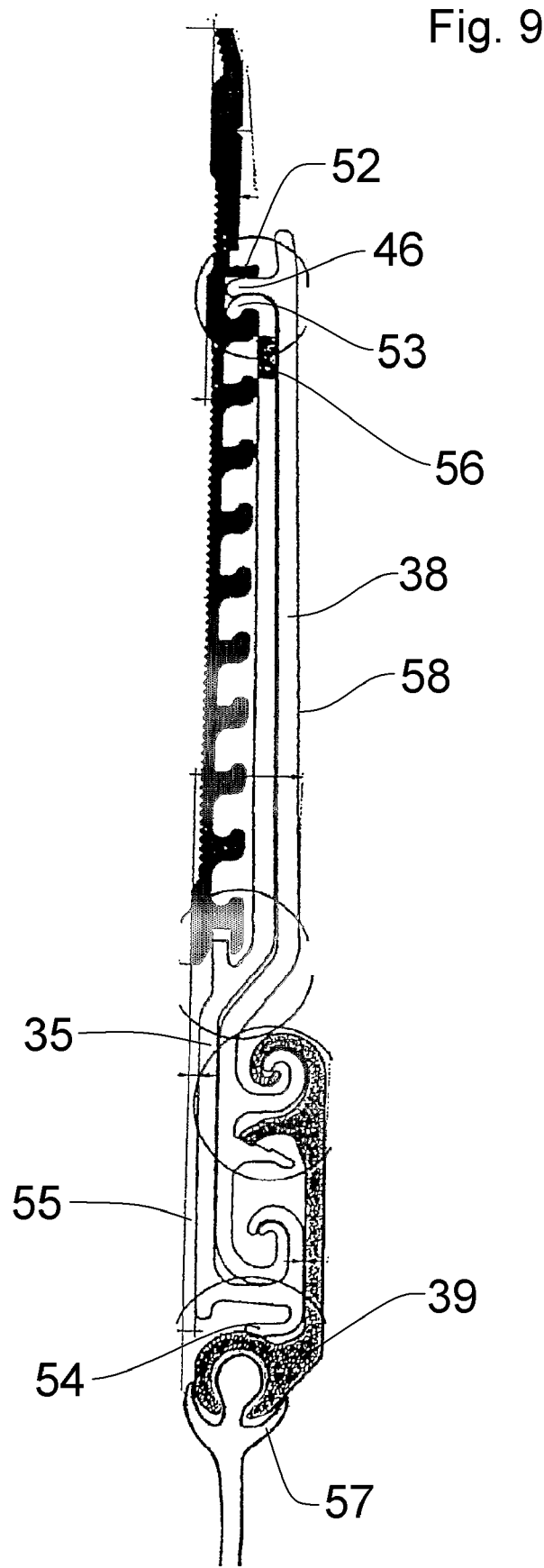
FIG. 9 shows another very user-friendly embodiment of the invention.

One embodiment of the invention is depicted in FIG. 9. In contrast to FIG. 8, the intermediate profile 35 is displaced by a free angle 55 relative to the frame profile so that additional play is produced. This permits easier opening of the device when the tarpaulin is to be disassembled, especially when dirt or small stones still adhere to the inside of the intermediate profile.

A hole or opening 56 in the intermediate profile 35 permits removal of the intermediate profile 35 from the hook-like frame profile 34. Openings of this type, which are produced by drilling or punching, and which are preferably reinforced in their periphery, can be provided at specified spacings along the frame.

In order to prevent dust, dirt, moisture, etc., from collecting in the gap between the weatherstrip of the tarpaulin and the weatherstrip holder 39, the tarpaulin has an apron-like part 57 in the area of the weatherstrip holder 39, which covers the gap between the weatherstrip and the weatherstrip holder 39 on both sides or is forced against it. The apron-like part 57 can be designed either in one piece with the tarpaulin, as shown in FIG. 9, or also applied subsequently, for example, by gluing, melting on, stitching, etc.

With the explained measures, reliable fastening of the individual components of the frame is therefore achieved even when the tarpaulin is missing without having to tolerate any adverse effect on the use or handling of the frame.

The invention is not restricted to the depicted and described practical examples, but can be modified in different ways. For example, the profile parts that form the frame and/or the profile parts that are connected to the tarpaulin can be designed in many pieces, in which spacings can be provided between the individual parts. Because of this, weight can be eliminated, the tarpaulin is easier to fold, recesses can be left open in trucks, and objects that protrude above the tarpaulin in individual locations can be transported, etc.

The invention claimed is:

1. A tarpaulin mounting frame comprising:
   a frame profile;
   an intermediate profile having at least one groove, said intermediate profile being connectable to said frame profile;
   an anchor profile having at least one receptacle for a weatherstrip holder and a rounded-off foot on its edge facing the tarpaulin, said rounded-off foot being insertable into said groove of said intermediate profile and pivotable therein, said weatherstrip holder being pivotable in said receptacle; and a support ledge extending out form said anchor profile, and a support ledge extending out from said weatherstrip holder, wherein pivoting said anchor profile about said support ledge of said weatherstrip holder until said support ledge of said anchor profile comes in contact with said support ledge of said weatherstrip holder and thereby stabilizes the connection;

wherein said anchor profile reaching a position substantially parallel to the plane of the tarpaulin by pivoting around said foot thereby tightening the tarpaulin, wherein said anchor profile between said foot and said receptacle for said weatherstrip holder being in contact with said intermediate profile.

2. The tarpaulin mounting frame as set forth in claim 1, wherein said anchor profile further comprising a mounting ledge, a spiral end opposite said mounting ledge, and a spiral hinge, said spiral end being adapted to be received in a hook on said intermediate profile allowing said anchor profile to pivot in relation to said intermediate profile.

3. The tarpaulin mounting frame as set forth in claim 2 further comprising a protrusion located above an upper most ledge on said frame profile, said protrusion being adapted to secure said mounting ledge of said anchor profile together with an upper hoop end on said intermediate profile when said anchor profile is pivoted toward said intermediate profile.

4. The tarpaulin mounting frame as set forth in claim 2 further comprising a spiral ledge located adjacent said hook of said intermediate profile, said spiral ledge provides a resistance force to said weatherstrip holder.

5. The tarpaulin mounting frame as set forth in claim 3 further comprising a groove defined at the end of said frame profile below said upper most ledge, and a stub ledge located on said intermediate profile adapted to be received in said groove of said frame profile.

6. The tarpaulin mounting frame as set forth in claim 1, wherein the outer surface of said weatherstrip holder has a light-reflecting surface.

7. The tarpaulin mounting frame as set forth in claim 1, wherein the outer surface of said anchor has a light-reflecting surface.

* * * * *